United States Patent [19]

Bruck

[11] 4,440,727
[45] Apr. 3, 1984

[54] TUBULAR FURNACE FOR PERFORMANCE OF GAS REACTIONS

[76] Inventor: Heinz Bruck, Lerchenweg 31, 6238 Hofheim/Taunus, Fed. Rep. of Germany

[21] Appl. No.: 408,827

[22] Filed: Aug. 17, 1982

[30] Foreign Application Priority Data

Sep. 3, 1981 [DE] Fed. Rep. of Germany ....... 3134851

[51] Int. Cl.³ .............................................. B01J 8/06
[52] U.S. Cl. ..................................... 422/197; 208/78; 585/301
[58] Field of Search ............................. 422/196, 197; 208/78–80; 585/301

[56] References Cited

U.S. PATENT DOCUMENTS

| | | | |
|---|---|---|---|
| 2,121,198 | 6/1938 | Jenkins | 422/197 |
| 2,987,382 | 6/1961 | Endter et al. | 422/197 |
| 3,230,052 | 1/1966 | Lee et al. | 422/197 |
| 3,259,469 | 7/1966 | Painter et al. | 422/196 |
| 3,334,971 | 8/1967 | James et al. | 422/197 |
| 3,671,198 | 6/1972 | Wallace | 422/197 |

FOREIGN PATENT DOCUMENTS

| | | | |
|---|---|---|---|
| 1041476 | 10/1958 | Fed. Rep. of Germany . | |
| 517744 | 2/1940 | United Kingdom | 422/197 |
| 1016208 | 1/1966 | United Kingdom | 422/197 |
| 1192688 | 5/1970 | United Kingdom | 422/197 |

Primary Examiner—Richard L. Chiesa
Attorney, Agent, or Firm—Cushman, Darby & Cushman

[57] ABSTRACT

There is described a furnace for the performance of gas reactions in a ceramic assembly of tubes in which the heating chambers (2), the recuperators (4) and the flue gas-branch channel (5) are arranged in a compact, energy saving type of construction. The furnace is especially suited for the production of hydrocyanic acid according to the BMA process (hydrocyanic acid-methane-ammonia process).

4 Claims, 3 Drawing Figures

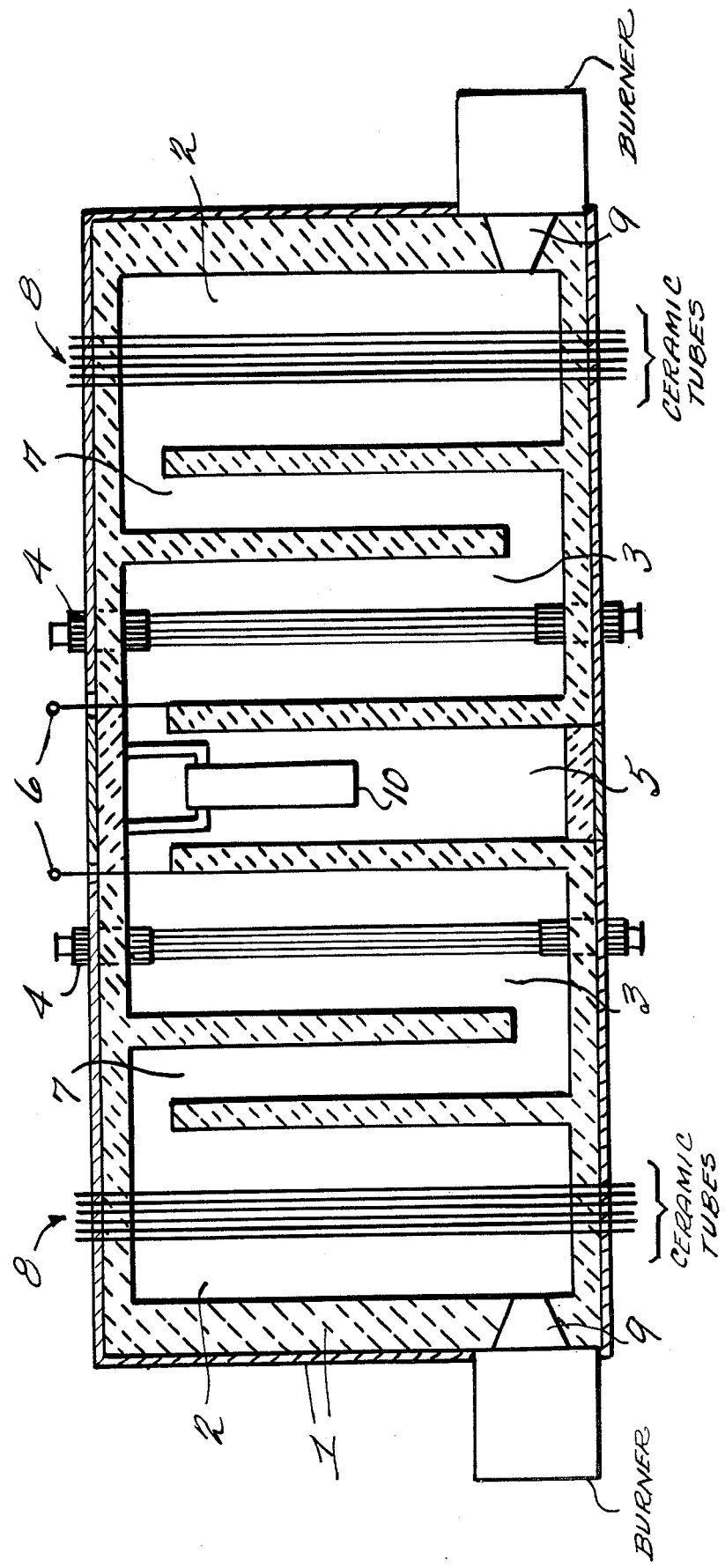

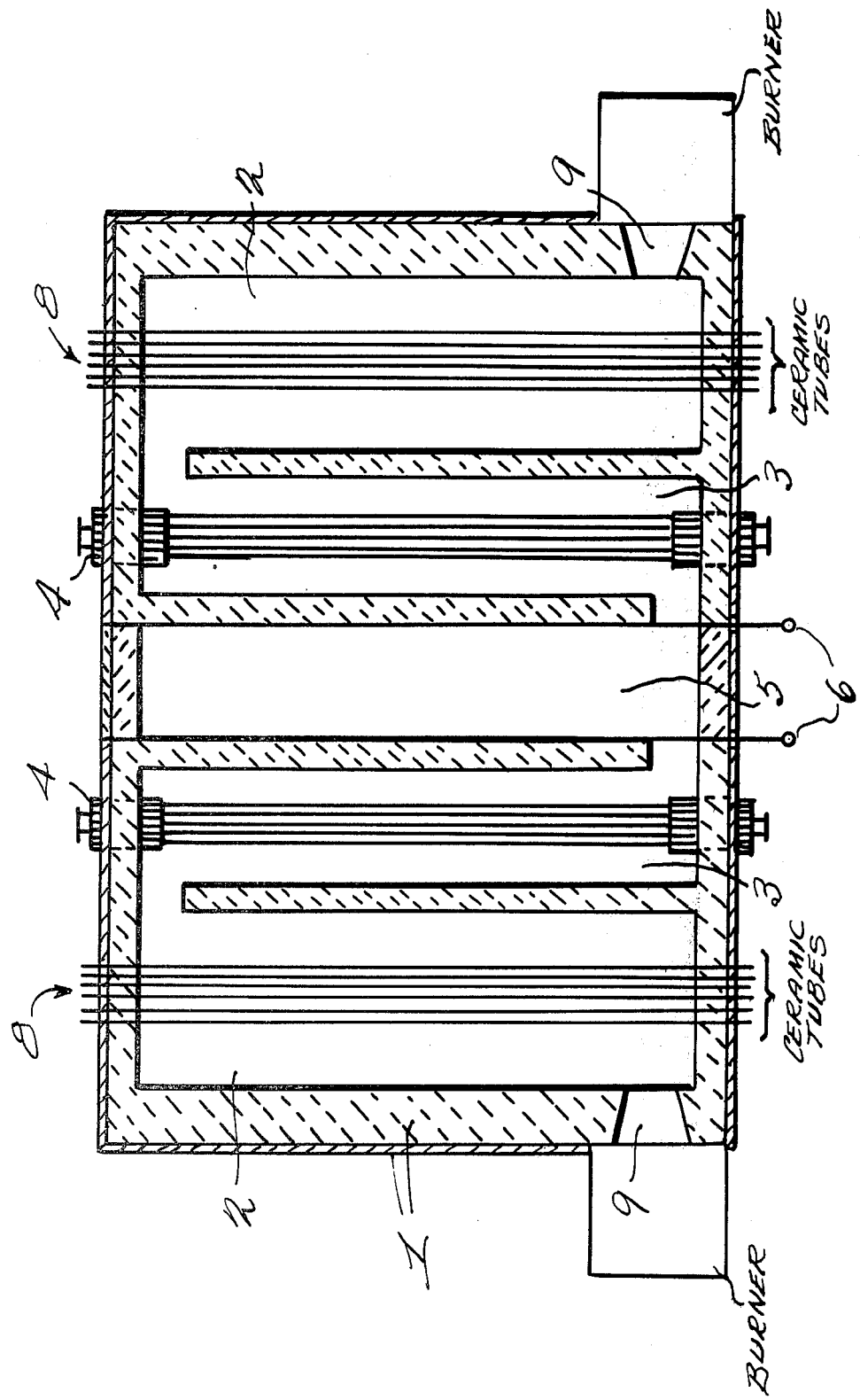

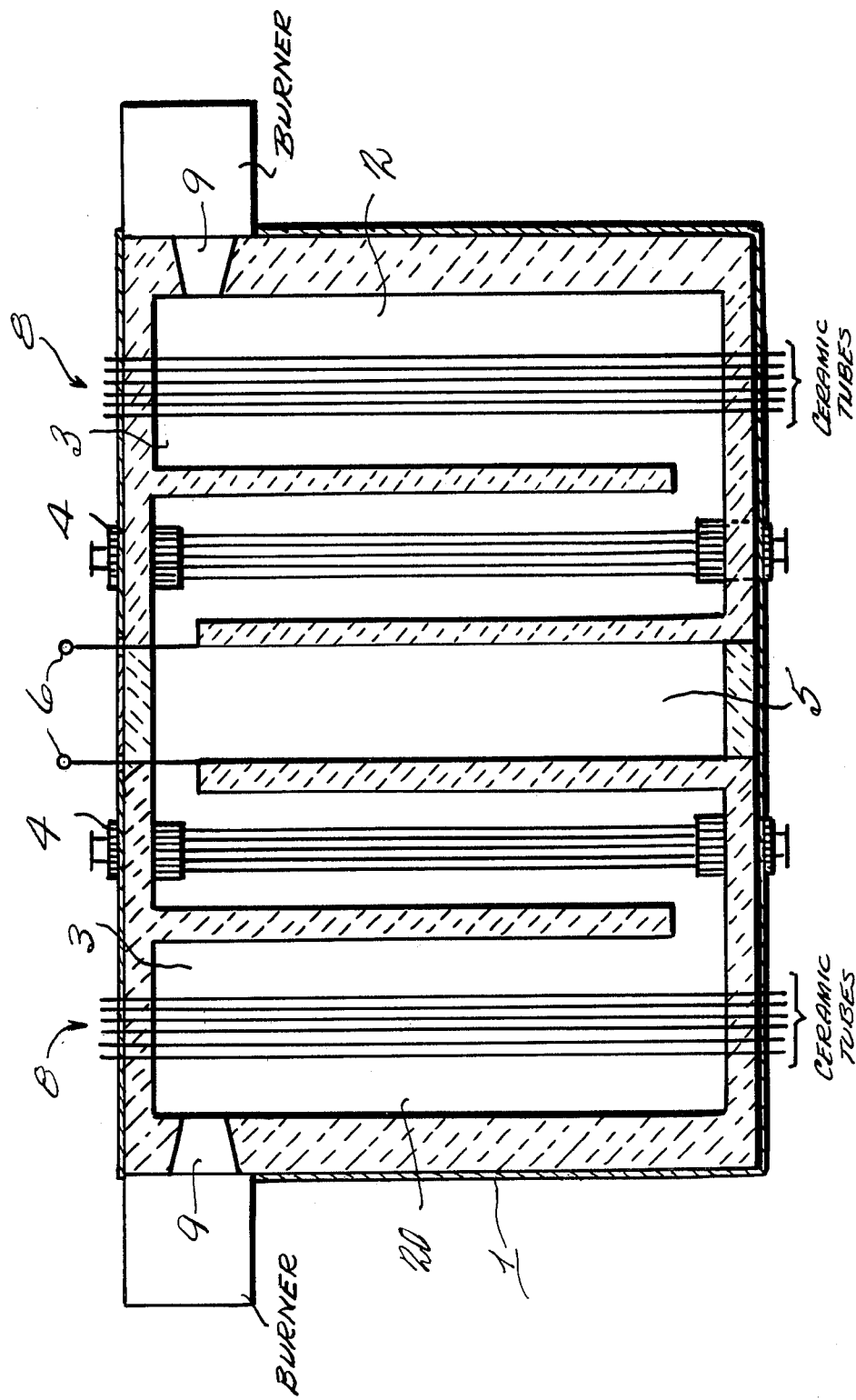

TUBULAR FURNACE FOR PERFORMANCE OF GAS REACTIONS

BACKGROUND OF THE INVENTION

The invention is directed to a tube furnace for the performance gas reactions, especially for the production of hydrocyanic acid according to the BMA process (hydrocyanic acid-methane-ammonia process), in which the individual structural parts in consideration of energy and industrial safety aspects are arranged in a special way to each other and besides each other. The previously known type furnaces for the performance gas reactions, especially at temperatures above 900° C., for example at temperatures between 1000° C. and 1500° C. consist of a series of parallel connected heating chambers which are mounted with freely suspended ceramic tubes or tube assemblies. Each of these chambers is heated separately. The flue gas discharge takes place via a separate branch channel which is joined via transition pieces with the individual chambers. The vertically arranged ceramic tubes, whose inside represents the actual reaction space, are supplied with the necessary heat for the reaction through the tube walls so that the heating chambers accordingly must be lined with a temperature resistant material. The heat is produced by gas or oil burners. The combustion air is heated recuperatively. The burners, of which 2 elements are needed per chamber, are arranged in the lower region of the chamber in order that the entire length of the reaction tubes as far as possible can be brought to the required reaction temperature. The heat of the departing flue gases can be used for preheating the air and/or for producing the steam.

It is possible with several furnaces, to connect every two furnaces to a common branch channel which then is arranged between these two furnaces and via a collection channel with the help of an induced draft blower to use the heat content of the flue gas in a waste-heat boiler for the production of steam.

The recuperators for the preheating of the combustion air are in each case arranged between two chambers and are heated simultaneously with the reaction tubes (German Pat. No. 1,041,476 and related Endter U.S. Pat. No. 2,987,382. The entire disclosure of Endter is hereby incorporated by reference and relied upon).

However, a disadvantage of great importance in this is that there are needed two burners per heating chamber so that when there are present a large number of heating chambers there must be manipulated and adjusted an even larger number of burners. This is not without problems since the combustion process and therewith the control of the reaction temperature is greatly influenced by the manner of travel of the burner. Among others, this is especially made difficult by the fact that freely suspended reaction tubes can only be incompletely sealed off compared to the lower furnace covering.

A further disadvantage of this known furnace is its quite large outer surface which leads to energy losses.

These disadvantages are avoided by the furnace of the invention. Also, through a different arrangement of the recuperators, there is produced a higher preheating of the combustion air and therewith a better cooling of the flue gases.

BRIEF DESCRIPTION OF THE DRAWINGS

FIG. 1 is a schematically drawn cross section of the furnace through a twin heating chamber and the component parts;
FIG. 2 shows an alternative construction; and
FIG. 3 shows still another form of the furnace.
In the drawings like numerals refer to like parts.

SUMMARY OF THE INVENTION

The subject matter of the invention is a tube furnace for the performance of gas reactions, especially for the production of hydrocyanic acid according to the BMA process, in ceramic tube assemblies which are freely suspended within the furnace in heating chambers and whereby the furnace contains as essential parts, burner a flue gas-branch channel and recuperators which is characterized by the furnace being essentially of a masonry block or cube 1 walled construction with a metal construction on the outside, with at least two twin type furnaces arranged next to each other, the furnace containing, in the form of a structural unit, the ceramic tube assembly heating chambers 2 arranged with recuperator spaces 3 having recuperators 4 and joined to the middle of the furnace as well as a flue gas branch channel 5 arranged between the two recuperator spaces 3 and whereby each heating chamber 2 has a maximum of only one burner 9.

A favorable development of the process of the invention comprises the provision of flue gas conduits 7 between the heating chamber 2 and the recuperator spaces 3 having control members 6. The flue gas conduits preferably receive the flue gases of the heating chamber in the vicinity of the upper furnace cover and preferably introduce these gases from below into the recuperator spaces.

A further improvement is produced by so dimensioning and arranging the recuperator spaces 3 as well as the recuperator components that they provide for one or more adjacently arranged heating chambers 2.

Finally it is additionally advantageous to form the furnace in such manner that there are arranged in the flue gas-branch channel one or more heat exchangers, one of which is indicated at 10, for the combustion air.

DETAILED DESCRIPTION

FIG. 1 is a schematically drawn cross section of the furnace through a twin chamber and the component parts. It should be recognized that under the twin type arrangement there is provided a Janus head type arrangment. In the drawing 1 indicates the building block or cube shaped formed entire furnace consisting of the brick lining with temperature resistant, fire proof material and a jacket, for example of sheet metal; 2 indicates the heating chambers, 3 a recuperator space with the recuperator component 4, 5 the flue gas branch channel, 7 the flue gas conduits and 6 the control members for the flue gas conduits, which controls are known per se, 8 represents the ceramic reaction tubes and 9 the burner. This type of twin unit is able to be arranged in any number in series in succession. For one manner of mounting the tubes, see the aforementioned Endter U.S. Pat. No. 2,987,382.

A further development of the form of the furnace of the invention is shown in FIG. 2. The reference numerals have the same meaning as in FIG. 1.

Finally, there is shown in FIG. 3 a development of the furnace of the invention in which as well as in FIG.

2, the flue gas conduits 7 are omitted and the burners 9 are arranged in the upper part of the heating chamber 2, so that the heating of the tube assembly is carried out in counterflow manner. The fule gases of the heating chamber 2 in this case are drawn off in the vicinity of the lower bottom plate and the recuperator spaces supplied from below. The reference numerals in FIG. 3 have the same meaning as in FIG. 1.

It is also possible within the invention to provide 2 or more heating chambers with only one burner.

Through the special conduit of the flue gas there is attained that a further utilization of its heat content only takes place when the true reaction process has already taken place.

The recuperators even can be exchanged for these during the operation of the adjacent chambers without disadvantage. Through this arrangement it is possible to mount the chamber with new tubes and for this time to throttle or even completely cut off the passage of the air through the recuperator and burner. This is made possible through the arrangement of the control members at the flue gas entrance-into the flue gas-branch channel.

The flue gas-branch channel 5 is arranged between the recuperator spaces as a continuous channel. It merely needs an upper and lower cover.

The customary manner of construction of for example, 2 piece chamber furnaces including the necessary flue gas-transition pieces and including the necessary branch channel has a reflecting surface of about 200 m$^2$. The furnace of the invention on the contrary only has a surface of 100 m$^2$ whereby in the region of the branch channel substantially lower temperatures occur.

Besides through the invention the volume of the furnace hours is reduced. In the customary construction of for example, 16 furnaces there is needed a furnace hours having about 21,000 m$^3$ of converted space, according to the invention about 12,500 m$^3$.

Besides the resulting savings in energy there are also substantially lower construction costs.

The flue gas-branch channel in which the flue gases of the heating chambers are collected is arranged between the heating chambers through which there results a considerable saving of space as well as a small reflecting surface. The two walls of the channels in each case are formed from the recuperator chambers so that there is only needed one lower and upper cover.

Through this arrangement there are eliminated the earlier required transition pieces between each heating chamber and the branch channel.

The air additionally can be preheated in this flue gas-branch channel before it is supplied to the recuperator or recuperators, with the help of the heat exchangers flue gas/air installed there.

The thus arranged branch channel for example, has on the upper and lower cover a surface of only about 12 m$^2$ while in comparison the branch channel of the known furnace inclusive of the transition piece has about 60 m$^2$ of reflecting surface.

The entire disclosure of German priority application No. P 3134851.3 is hereby incorporated by reference.

What is claimed is:

1. In a tube furnace suitable for carrying out a gaseous chemical reaction for the production of hydrocyanic acid in ceramic tubes which are suspended in a heating chamber of the furnace, the furnace including burner means, a flue gas channel and recuperator means, the improvement comprising, in combination, an outer wall having a metal covering, two interior heating chambers, a separate burner means for heating each said heating chamber, a plurality of ceramic tubes suspended in each said heating chamber, each said heating chamber having a recuperator chamber in flow communication therewith and a flue gas channel for receiving flue gases from both said recuperator chambers, said flue gas channel being located between said recuperator chambers, said furnace including a flue gas conduit between each said heating chamber and said respective recuperator chamber, said furnace having an upper cover with each flue gas conduit receiving flue gas near said upper cover of said furnace, each said recuperator chamber having an opening adjacent a wall opposite said upper cover and each said flue gas conduit being arranged to discharge flue gas into said opening of each said recuperator chamber.

2. a tube furnace according to claim 1 including control means for the flue gas conduit.

3. The tube furnace as claimed in claim 1 wherein recuperator means are located in each said recuperator chamber and each said recuperator chamber feeds the flue directly from each said heating chamber to said flue gas channel.

4. The tube furnace as claimed in claims 1, 2, or 3 wherein heat exchange means are located in said flue gas channel.

* * * * *